Feb. 8, 1949.    W. B. ELLWOOD    2,461,202
MAGNETIC TESTING DEVICE
Filed March 28, 1945

INVENTOR
W. B. ELLWOOD
BY
O.D.M. Guthe
ATTORNEY

Patented Feb. 8, 1949

2,461,202

UNITED STATES PATENT OFFICE 2,461,202

MAGNETIC TESTING DEVICE

Walter B. Ellwood, New York, N. Y., assignor to Bell Telephone Laboratories, Incorporated, New York, N. Y., a corporation of New York Application March 28, 1945, Serial No. 585,291

10 Claims. (Cl. 175—183)

This invention relates to magnetic testing means and particularly to means for testing the magnitude and other properties of magnetic fields.

An object is to provide a simple testing arrangement for testing magnetic fields without damaging or otherwise disturbing the elements that may produce such fields in their environments.

Heretofore, devices have been provided for measuring magnetic properties of a metal element under different heat treatments to indicate corresponding temperature conditions.

A feature of the present invention is the provision of a testing means for indicating the magnetic qualities of magnetic fields that function by merely exposing the testing means to such fields or by having it make physical contact with the elements producing the fields without in any way disturbing or injuring such elements.

Another feature is to provide such testing means that produces by an electrical current a magnetomotive force that matches the magnetic properties of the field or element tested and that identifies the required electrical current as a symbol of the magnetic properties of the field or element tested.

The invention has been illustrated in the accompanying drawings in which Fig. 1 shows a fragmentary view of an embodiment of the applicant's invention applied to an element to be tested;

Figure 1:
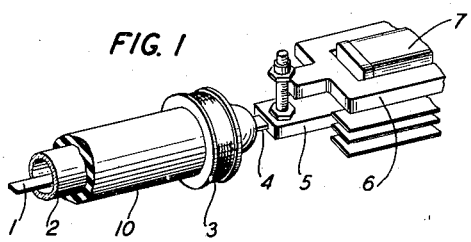
Figure 2:
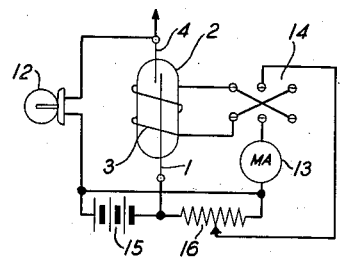
Fig. 2 shows schematically a preferred form of the applicant's invention.

Referring now to the drawings, in general the testing device consists of a reed type relay in which magnetic reeds are enclosed in a vessel and which may be magnetized to establish a connection between them on the energization of an outside coil. In Fig. 1, a fragmentary view has been shown of this magnetic reed type relay showing a portion of one of the reeds 1, an enclosing vessel 2 and a surrounding coil 3. The other reed 4 has been shown extending as a probe outside of the vessel 2 and in contact with a core 5 of a relay such as is well known in the telephone art and having an armature 6 and a coil 7 surrounding the core 5. Surrounding the tube 2 is an insulation sleeve 10 at one end of which the coil 3 is mounted, while the other end may be extended into a handle not shown for holding this testing relay against an element to be tested. Associated with this relay as shown in Fig. 2 is a circuit including a carbon filament signal lamp 12, a current measuring device 13 such as a milliammeter, a two-way switch 14, a source of current 15, and a variable resistance 16. To test the magnetic properties of an element by means of this arrangement as shown in Fig. 2, the reed 4 is applied as shown in Fig. 1 to the core 5. The magnetic properties of the core 5 may be the residual magnetism which remains after the relay has been energized and deenergized. When the reed 4 touches the core 5, this reed being magnetic will be magnetized to a value equal to the value of the residual magnetism in the core 5. If now switch 14 is operated towards the left, coil 3 will be energized by current from battery 15, variable resistance 16, switch 14, coil 3, meter 13 back to battery 15. The coil 3 in energizing causes the reeds 4 and 1 to attract each other and current will then be transmitted through these reeds for the lighting of lamp 12 from battery, lamp 12, reeds 4 and 1 back to battery to indicate this condition. If now the switch 14 is open, coil 3 is deenergized but reeds 4 and 1 will remain attracted to each other due to the magnetism in reed 4 as produced by the residual magnetism in core 5 as reed 4 acts as a permanent magnet under these conditions. If the switch 14 is then operated towards the right coil 3 will be energized by current flowing in the opposite direction over the above-mentioned circuit from battery 15. The magnetomotive force produced by the energization of the coil in this direction tends to separate the reeds 1 and 4 in opposition to the magnetism present in the reed 4 to maintain the reeds closed. If the variable resistance 16 is then adjusted to the point where the electromagnetic force produced by coil 3 overcomes or matches the magnetic attraction of the reeds to each other so as to cause these reeds to separate, the lamp 12 will be extinguished to indicate when this separation takes place. At that time if a reading is taken on the meter 13 of the current required for accomplishing this separation of the reeds said reading may be interpreted as a symbol of the residual magnetism in core 5.

Figure 3:
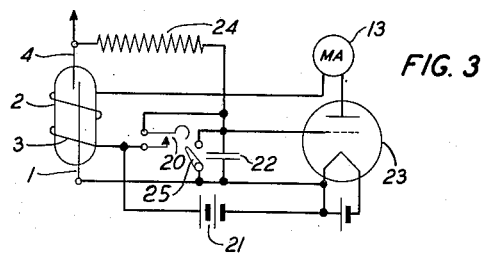
Figs. 3 and 4 show modified forms of the applicant's invention.

Referring now to Fig. 3, the modified arrangement shown in this figure consists of the same type of reed relay as in Figs. 1 and 2 with a key 20, a source of current 21, a condenser 22 and a vacuum tube 23, the meter 13 and a resistance 24. This circuit is for the purpose of measuring the residual magnetism in an element to be tested in which the residual magnetism is not sufficient to maintain the reeds 1 and 4 attracted after having been previously attracted by the energization of the coil 3 and permitted to release by the deenergization of coil 3. The procedure in operating this mechanism is somewhat different and automatic in this respect that all the operator has to do is to momentarily operate the switch 20 after having made a connection between the reed 4 and the core 5. On the closing of this switch a circuit is established from battery 21, contacts of switch 20, condenser 22, back to battery 21. This charges the condenser and as the grid of tube 23 is connected between the switch 20 and condenser 22, a potential is established on the grid to make tube 23 active to close a circuit through coil 3 from battery 22, coil 3, meter 13, plate and filament of tube 23, back to battery 21. Coil 3 in thereby energizing causes the reeds 1 and 4 to attract each other and when the switch 20 is opened, the condenser 22 will gradually discharge through resistance 24, reeds 4 and 1 back to the condenser 22. This gradually changes the potential on the grid and tube 23 to gradually decrease the current flow through the tube 23. Consequently the electromotive force produced by the coil 3 to maintain the reeds 4 and 1 attracted is correspondingly decreased until the value of this electromotive force plus the magnetism of reed 4 will not be sufficient to maintain the reeds attracted. When this takes place, that is, when reeds 1 and 4 separate, the current through the tube being measured by the meter 13 gives an indication of the value of the residual magnetism of the core 5 and may be used as a symbol of this magnetic quality of the core. To fully discharge condenser 22 after the connection between reeds 1 and 4 is opened, switch 25 may be closed for a suitable duration of time.

Figure 4:
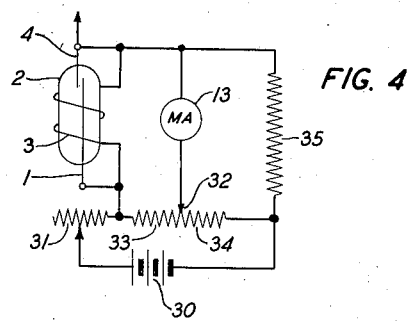

Fig. 4 shows another modification of the applicant's invention using the same relay with the reeds 4 and 1 and coil 3 connected in parallel in one leg of a Wheatstone bridge. The battery 30 may be controlled by a rheostat 31 which may be adjusted so that the reeds 4 and 1 and coil 3 act as a buzzer with the reeds 4 and 1 closed, for example, about 50 per cent of the time. Before the reed is made to contact with core 5 the precise setting of the meter 13 to any convenient value can be obtained by the adjusting of the pointer 32 on the slider wire or rheostat ratio arms comprising the two arms 33 and 34 of the bridge network and resistance 35 serves as the fourth arm of the bridge network. If the reed 4 is now brought in contact with core 5, the percentage time the coil 3 is energized under these circumstances will change the corresponding reading or deflection of the meter 13. The reading of the meter on the deflection may serve as a symbol of the residual magnetism of core 5.

While the device has been described as employed to measure the magnetic properties of a specific magnetic structure by being placed in contact therewith, it is not limited to such use. It may also be employed to measure magnetic fields in free space or near a magnetic structure without contacting with the structure. Its manner of use is similar to the above description. All that is required is to expose the reeds to the field to be tested.

What is claimed is:

1. In a device for testing the residual magnetism of the core of a relay, a pair of magnetic reeds operative to attract each other when subjected to the full magnetization of said core when said relay is energized and operating to remain attracted to each other when subjected to the residual magnetism remaining in said core after said relay is deenergized, a coil around said reeds, means for energizing said coil to magnetize said reeds to overcome the magnetization caused by said residual magnetism and to cause said reeds to separate, and means for indicating the value of the energizing force required for said separation of the reeds as a symbol of the value of said residual magnetism.

2. In a device for testing the magnetic properties of a relay core with regard to the remaining magnetic force after the relay is deenergized, a glass enclosed magnetically operative switch comprising two magnetic reeds and a coil surrounding the air-gap of said reeds, means for connecting one of said reeds to the end of the core of said relay to be tested to cause said reeds to attract each other to establish a connection between them by magnetic force in said core when the relay is energized and deenergized, said reeds maintaining said connection by the magnetic force remaining in said core after said relay is deenergized, a signal lamp and a source of current in series across said reeds to light said lamp when said connection is made to indicate this condition, circuit means for gradually increasing current from said source in a direction through said coil so as to cause said reeds to separate and open said connection in opposition to said remaining magnetic force, said lamp indicating by being extinguished the open condition of the reeds, a meter in said circuit means to indicate said value of the energizing current at the moment the reeds are separated and serving as a symbol of the value of said remaining magnetic force in said core.

3. In a device for testing the residual magnetism of a relay core, a pair of magnetic reeds, means for subjecting said reeds to the residual magnetism of said core to produce an electromagnetic force in said reeds, said reeds being of such magnetic properties as not to attract and close a connection between them when subjected to said residual magnetism, a coil around said reeds, means for energizing said coil to magnetize said reeds to attract each other and close and means for gradually decreasing said magnetization by deenergization of said coil to such a value that the remaining magnetomotive force applied by said coil plus the magnetomotive force supplied by said residual magnetism to said reeds is not sufficient to hold said reeds attracted but permits them to separate and means for indicating the value of the magnetizing current remaining in said coil on the separation of said reeds as a symbol of the value of said residual magnetism in said core.

4. In a device for testing the property of a magnetic field, a pair of magnetic reeds adapted to attract each other and make electrical closure with each other when sufficiently magnetized, means for magnetizing said reeds from said field, said magnetization being insufficient to cause closure of said reeds, means for superimposing on the magnetization thereof additional magnetization by means of electrical energy to cause said reeds to make electrical closure with each other, means for indicating the closure of said reeds and means for indicating the said energy as a symbol of the magnetic property of said field.

5. In a device for testing an element for its magnetic properties, a pair of magnetic reeds adapted to attract each other and to make closure with each other when sufficiently magnetized, means for connecting one of said reeds with said element for magnetizing said one reed, said magnetization being insufficient to cause said reeds to make closure with each other, a coil around said reeds, circuit means connected to said coil and operative to superimpose additional magnetization in the said one reed by means of a current flow through said coil to cause said reeds to make closure with each other, means for detecting the closure of said reeds by utilizing a current flow through said reeds and means for indicating the current flow in said coil as a symbol of the magnetic properties of said element.

6. In a device for testing the residual magnetism of a relay core, a pair of magnetic reeds, means for subjecting said reeds to the residual magnetism of said core to produce an electromagnetic force in said reeds, said reeds being of such magnetic property as not to attract and close a connection therebetween when subjected to said residual magnetism, a coil around said reeds, means for energizing said coil to magnetize said reeds to attract each other and close and means for indicating the value of the magnetizing current remaining in said coil on the closure of said reeds as a symbol of the value of said residual magnetism in said core.

7. In a device for testing the property of a magnetic field, a pair of magnetic reeds adapted to attract each other and make electrical closure with each other when sufficiently magnetized, means for magnetizing said reeds from said field, said magnetization being sufficient to cause closure of said reeds, means for superimposing on the magnetization thereof additional magnetization by means of electrical energy to cause said reeds to open said closure therebetween, means for indicating the opening of said closure and means for indicating the said energy as a symbol of the magnetic property of said field.

8. In a device for testing an element for its magnetic properties, a pair of magnetic reeds adapted to attract each other and to make closure with each other when sufficiently magnetized, means for connecting one of said reeds with said elements for magnetizing said one reed, said magnetization being sufficient to cause said reeds to make closure with each other, a coil around said reeds, circuit means connected to said coil and operative to superimpose additional magnetization in the said one reed by means of a current flow through said coil to cause said reeds to open the closure therebetween, means for detecting the opening of said closure by utilizing the interruption of a current flow through said reeds and means for indicating the current flow into said coil as a symbol of the magnetic properties of said element.

9. In a device for testing the property of a magnetic field, a pair of magnetic reeds adapted to attract each other and make electrical closure with each other when sufficiently magnetized, means for magnetizing said reeds from said field, said magnetization being insufficient to cause closure between said reeds, means for superimposing on the magnetization thereof additional magnetization by means of electrical energy to cause said reeds to make closure, means for thereafter reducing said additional magnetization by reducing said energy to cause the opening of said closure between said reeds, means for indicating the opening of said closure and means for indicating the said reduced energy as a symbol of the magnetic property of said field.

10. In a device for testing an element for its magnetic properties, a pair of magnetic reeds adapted to be attracted to each other and make closure with each other when sufficiently magnetized, means for connecting one of said reeds with said elements for magnetizing said one reed, said magnetization being insufficient to cause closure between said reeds, a coil around said reeds, circuit means connected to said coil and operative to superimpose additional magnetization in the said one reed by means of a current flow through said coil to cause said reeds to make closure between each other, means for thereafter reducing said current flow to neutralize part of said additional magnetization in said one reed to cause said reeds to open the closure therebetween, means for detecting the opening of said closure of said reeds by utilizing the interruption of a current flow through said reeds and means for indicating the reduced current flow in said coil as a symbol of the magnetic properties of said element.

WALTER B. ELLWOOD.

REFERENCES CITED

The following references are of record in the file of this patent:

UNITED STATES PATENTS

| Number | Name | Date |
|---|---|---|
| 541,719 | Clark | June 25, 1895 |
| 1,292,279 | Eisenmann | Jan. 21, 1919 |
| 1,335,647 | Bierbower | Mar. 30, 1920 |
| 1,666,309 | Ray | Apr. 17, 1928 |
| 2,010,813 | Dysart | Aug. 13, 1935 |
| 2,318,666 | Bruce | May 11, 1943 |